UNITED STATES PATENT OFFICE.

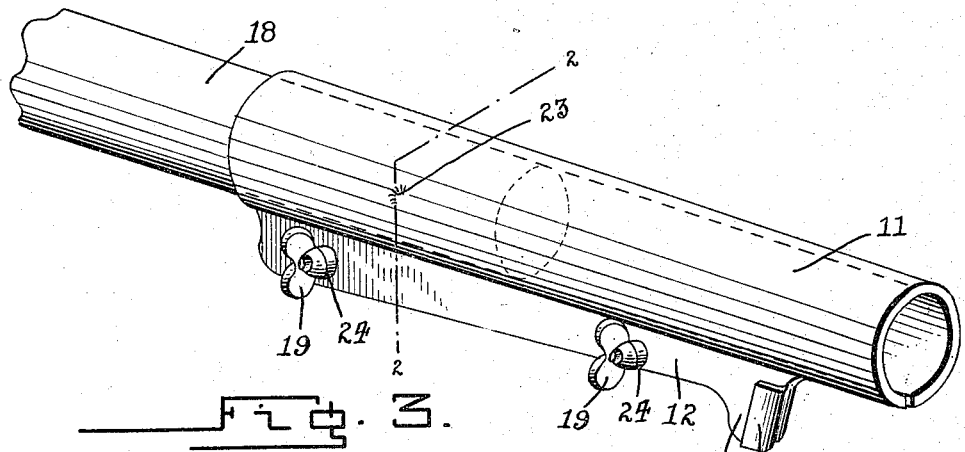
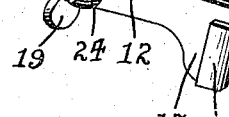
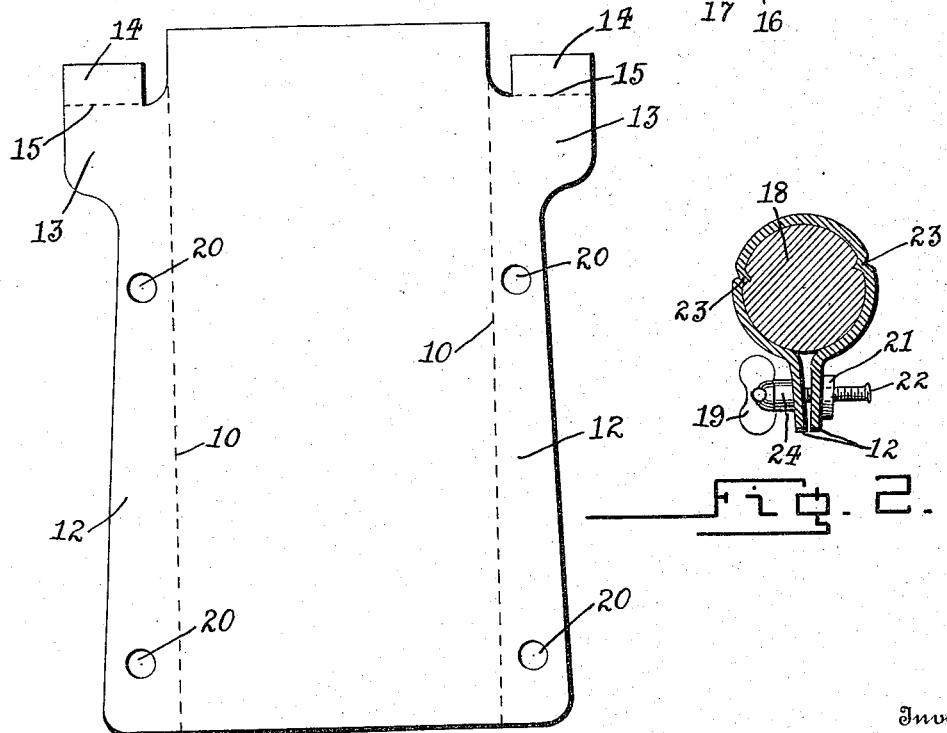

RICHARD G. HARRIER, OF DUFF, NEBRASKA.

WAGON-POLE ATTACHMENT.

1,145,309.　　　　　Specification of Letters Patent.　　Patented July 6, 1915.

Application filed August 19, 1914. Serial No. 857,559.

*To all whom it may concern:*

Be it known that I, RICHARD G. HARRIER, a citizen of the United States, residing at Duff, in the county of Rock and State of Nebraska, have invented certain new and useful Improvements in Wagon-Pole Attachments, of which the following is a specification.

This invention relates to a wagon pole attachment which is provided so that the wagon pole may be lengthened when desired, thus making it possible to use the wagon pole with either two horses or with four horses.

Another object of the invention is to provide an attachment of the character described which is so constructed that it may be easily moved upon the pole and then tightly secured in the adjusted position.

Another object of the invention is to so construct the device that it may take the place of the pole tip which is usually provided upon the end of a pole.

This invention is illustrated in the accompanying drawings wherein:

Figure 1 is a perspective view showing the attachment in place. Fig. 2 is a transverse sectional view taken along the line 2—2 of Fig. 1. Fig. 3 is a view of the blank from which the attachment is formed.

This attachment is formed from a blank of sheet metal, which is shown in Fig. 3, the blank being folded along the dotted lines 10 to form the tubular body portion 11 and longitudinally extending flanges 12, which flanges terminate at their forward ends in the enlargements 13. These enlargements 13 have their end portions 14 bent along the dotted lines 15 to form the tongues 16 which are folded to lie flat against the outer faces of the enlargements 13. These enlargements when brought together form an abutment 17, the forward edge of which is reinforced by the tongues 16, so that the abutment will not be bent by the lifting of the neck yoke which is placed about the forward end of the tubular body portion in the manner which is customary.

In order to tightly secure the attachment in an adjusted position upon the bolt 18, there have been provided wing screws 19 which pass through the openings 20 in the flanges 12, and carry securing nuts 21 which are held upon the bolts 19 by the rivet heads 22 formed upon the bolts. As an additional means for holding the attachment in place and preventing it from having rotary motion upon the pole, there have been provided pins 23 which dig into the pole when the bolts 19 are tightened as shown in Fig. 2.

When this attachment is in place, it is mounted upon the outer end of the pole in the manner shown in Fig. 1, and is then secured by tightening the bolts 19. If the attachment extends too far beyond the end of the pole, or does not extend far enough beyond the end of the same, the bolts may be loosened and the attachment then moved longitudinally upon the pole to the proper position and the bolts again tightened.

It should be noted that since the attachment is formed of resilient material, the flanges 12 by engaging the shoulders 24 of the bolts and the inner faces of the nuts 21 will serve as a means for locking the nuts and preventing them from easily working loose.

It should be noted that this attachment can be easily removed from the pole, and therefore it can be transferred from one pole to another. This makes it unnecessary to provide an attachment for each pole a person may have, since the attachment can be transferred from one pole to the other whenever desired.

I claim:

1. In an attachment of the character described formed from a blank of resilient material bent longitudinally to form a tubular body portion having longitudinally extending flanges provided with fastener-receiving openings, the outer end portions of said flanges being enlarged and terminating in tongues bent back upon themselves to form reinforcements for the outer edge portion of the enlargements, securing bolts passing through the openings of said flanges and having abutment shoulders engaging one of said flanges, and securing nuts threaded upon said bolts and engaging the second flanges.

2. An attachment of the character described formed from a blank of resilient material bent longitudinally to form a tubular body portion having longitudinally extending flanges, the outer end portions of said flanges being enlarged and terminating in tongues bent back upon themselves to form reinforcements for the outer edge portions of the enlargements, and securing means engaging said flanges.

In testimony whereof I affix my signature in presence of two witnesses.

RICHARD G. HARRIER.

Witnesses:
W. A. BUCKLIN,
E. R. HARRIER.

Copies of this patent may be obtained for five cents each, by addressing the "Commissioner of Patents, Washington, D. C."